United States Patent [19]
Ro

[11] Patent Number: 5,105,314
[45] Date of Patent: Apr. 14, 1992

[54] MULTIPLE AUDIO SIGNAL PROCESSING SYSTEM

[75] Inventor: Il-young Ro, Suwon, Rep. of Korea

[73] Assignee: Samsung Electronics Co., Ltd., Suwon, Rep. of Korea

[21] Appl. No.: 395,653

[22] Filed: Aug. 18, 1989

[30] Foreign Application Priority Data

Aug. 23, 1988 [KR] Rep. of Korea ............... 88-10716

[51] Int. Cl.[5] .................................................. G11B 5/86
[52] U.S. Cl. ..................................... 360/15; 369/15/85
[58] Field of Search ................. 360/15; 369/84, 85, 369/15, 14

[56] References Cited

U.S. PATENT DOCUMENTS

| | | | |
|---|---|---|---|
| 4,901,302 | 2/1990 | Yamada | 369/85 |
| 4,916,681 | 4/1990 | Takamatsu | 369/85 |
| 4,935,924 | 6/1990 | Baxter | 370/73 |
| 4,937,807 | 6/1990 | Weitz et al. | 369/15 |
| 4,964,109 | 10/1990 | Yoshioka | 360/51 |

Primary Examiner—David J. Severin
Attorney, Agent, or Firm—Robert E. Bushnell

[57] ABSTRACT

A multiple audio signal processing system is disclosed which comprises: a composite system combining a digital audio tape recorder and a compact disc player; a system controller for controlling the operation of the composite system in accordance with the data inputted into a data input of the composite system; and a signal path control circuit for deciding the signal paths in accordance with a series of control signals outputted from the system control circuit. The device of the present invention makes it possible that the output signals of the compact disc player and input signals from the external can be selectively recorded on a tape loaded in the deck of the digital audio tape recorder, and the output signals of the digital audio tape recorder and the compact disc player can be outputted to the outside in accordance with the desire of the user.

11 Claims, 2 Drawing Sheets

MULTIPLE AUDIO SIGNAL PROCESSING SYSTEM

FIELD OF THE INVENTION

The present invention relates to a multiple audio signal processing system, and particularly to a multiple audio signal processing system which is used for a composite system constituted by combining at least two systems such as a digital audio tape recorder and a compact disc player wherein the output signals of the compact disc player or the line input signals from the external source can be selectively recorded on the digital audio tape recorder, and the output signals from the above-mentioned two systems can be selected and outputted to the outside.

BACKGROUND OF THE INVENTION

Generally, the storage and transmission of various kinds of information are being digitalized with the advent of the information society, and further, in some countries, digital information eras have been entertained because compact discs and their PCM broadcastings using satellites have been extensively supplied.

Digital audio tape recorder is one of the fields which the digitalization of information is becoming more advanced.

Unlike the compact disc players and the unilaterally transmittable PCM broadcastings, digital audio tape recorders make it possible to arbitrarily record and regenerate various kinds of information.

If output signals of the compact disc player are desired to be recorded onto a tape of the digital audio tape recorder, the input and output terminals of the two systems should be connected by means of a line, and the sampling rates of the two systems should be the same each other.

If the sampling rates of the two systems are different from each other, no reproduction can be made by the above mentioned method, and therefore, there is the problem that an expensive digital analogue converter has to be installed within the digital audio tape recorder.

SUMMARY OF THE INVENTION

Therefore, it is an object of the present invention to provide a multiple audio signal processing system of a composite type which is constituted such that a compact disc player is installed within a digital audio tape recorder.

It is another object of the present invention to provide a multiple audio signal processing system of the above-mentioned composite type which is capable of recording the output signals of the compact disc player to a tape loaded in the deck of the digital audio tape recorder.

It is still another object of the present invention to provide a multiple audio signal processing system of the above-mentioned composite type, in which the output signals of the compact disc player or input signals from the external source can be selectively recorded on a tape loaded in the deck of the digital audio tape recorder, and the output signals of the digital audio tape recorder and the compact disc player can be outputted to the outside.

In achieving the above objects, the device of the present invention comprises: a means for forming a composite system in combining a digital audio tape recorder and a compact disc player; a system control means for controlling the operation of the composite system in accordance with the data inputted into a data input means of the composite system; and a signal path control means for deciding the signal paths in accordance with a plurality of control signals outputted from the system control means.

BRIEF DESCRIPTION OF THE DRAWINGS

The above objects and other advantages of the present invention will become more apparent by describing the preferred embodiment of the present invention with reference to the attached drawings in which.

DESCRIPTION OF THE PREFERRED EMBODIMENT

Figure 1:
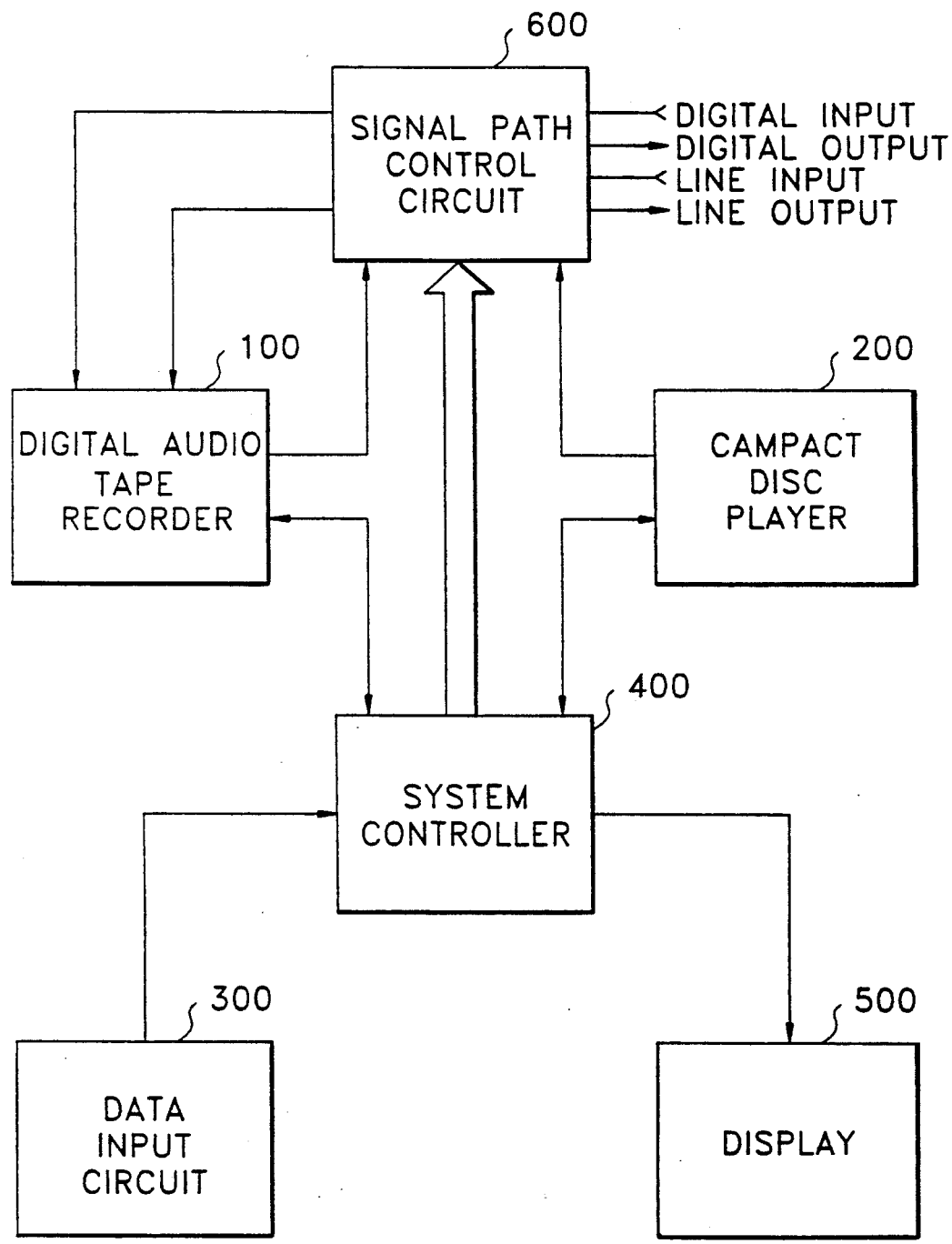
FIG. 1 is a block diagram of the multiple audio signal processing system according to the present invention.

As shown in the block diagram of FIG. 1 for the multiple audio signal processing system according to the present invention, the composite system constituted by combining a digital audio tape recorder 100 and a compact disc player 200 includes a system control means 400, and the system control means 400 is constituted such that it is capable of controlling the operation of the composite system in accordance with the data inputted into a data input means provided within the composite system.

A signal path control means 600 is constituted such that it is capable of deciding the signal transmission paths in accordance with a plurality of signals ($C_1$–$C_4$) outputted from the system control means 400.

A display means 500 is capable of displaying to the external the data inputted into a data input 300.

Figure 2:
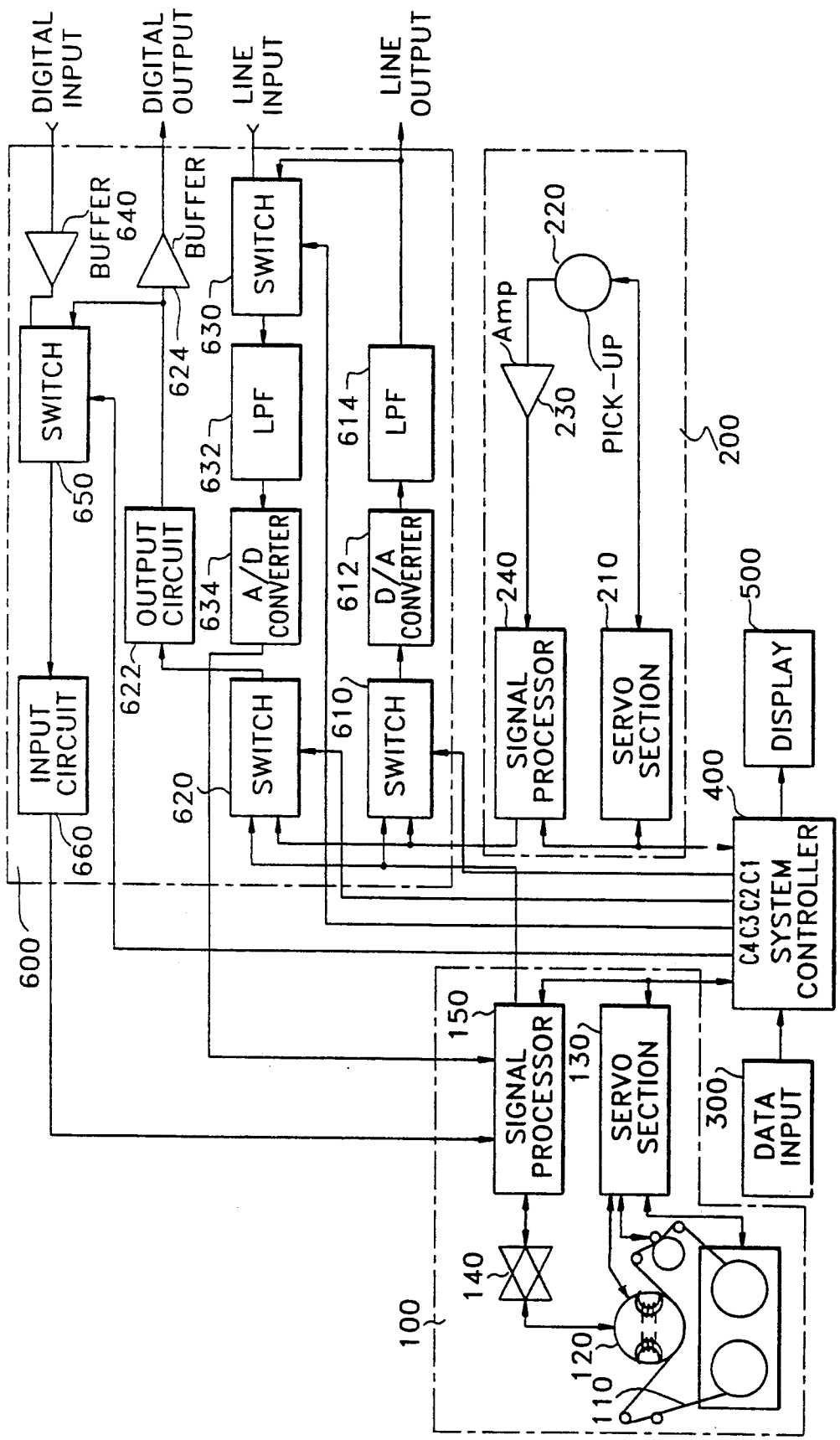
FIG. 2 is circuital illustration of the multiple audio signal processing system according to the present invention.

FIG. 2 is more detailed circuital illustration of the multiple audio signal processing system of FIG. 1.

In this drawing, a switch 610 which is provided within the signal path control means 600 selects the outputs from the signal processor 150 of the digital audio tape recorder 100 and from the signal processor 240 of the compact disc player 200 in accordance with the level of the control signal C1 outputted from the system control means 400, so that the selected signals should be outputted by a line through a D/A converter 612 and a low pass filter 614.

Meanwhile, another switch 620 selects the signals outputted from the signal processors 150, 240 of the digital audio tape recorder 100 and of the compact disc player 200 in accordance with the level of a control signal C2 outputted from the system control means 400, so that the selected signals should be outputted through a digital output circuit 622 and a buffer 624.

Still another switch 630 selects the signal incoming through the low pass filter 614 and the line-inputted signals in accordance with the level of a control signal C3 outputted from the system control means 400, the selection being made in such way that the clock frequencies of a low pass filter 632 and an A/D converter 634 should be equal to sampling frequency of the digital audio tape recorder 100.

Still another switch 650 selects the digital input signals and the signals passing through the digital output circuit 622 in accordance with the level of a control signal C4 outputted from the system control means 400, so that the selected signals should be supplied through a digital input circuit 660 to the signal processor 150 of the digital audio tape recorder 100.

The digital audio tape recorder 100 is provided with; a servo section 130 for being controlled by the system control means 400; a drum 120 for being driven by the servo section 130 and for recording and regenerating various signals; an amplifier 140 for recording and regenerating; and a signal processor 150.

The compact disc player 200 is constituted such that a servo section 210 is controlled by the system control means 400, and the picked-up compact disc regeneration signals are outputted through the signal processor 240.

The multiple audio signal processing system according to the present invention constituted as above will now be described as to its operations.

First, in order to regenerate the data recorded on a tape of the digital tape recorder 100, the relevant data is inputted into the data input means 300 of FIG. 2, and then the servo section 130 will be activated by the system control means 400 to drive the drum 120.

Accordingly, the data recorded on the tape are picked up, and are supplied through the regeneration amplifier 140 to the signal processor 150.

At this time, the system control means 400 will supply the required control signals to the signal processor 150, and at the same time, will also supply the control signals C1, C2 to the switches 610, 620.

Thus, the signals processed by the signal processor 150 will be supplied to each one of the terminals of switches 610, 620, and therefore, the output signals of the signal processor 150 will be supplied to both the digital output circuit 622 and the D/A converter 612. Here, the D/A converter 612 converts the inputted digital signals to analogue signals, and outputs the analogue signals through the low pass filter 614, while the digital signals which have passed through the digital output circuit 622 will be buffered by the buffer 624, and will be outputted as regeneration signals.

As described above, when the digital audio tape recorder 100 is operated under a regeneration mode, the control signals C3, C4 outputted from the system control means 400 will be in a "don't it care" state, and the compact disc player can be driven, although it is desirable not to drive it in order to save the power consumption.

Meanwhile, if the relevant data is inputted into the data input means 300 in order to regenerate the data recorded on a compact disc of the compact disc player 200, the servo section 210, after being activated by the system control means 400, will drive the pick-up section 220, so that the data recorded on the compact disc should be picked up, be amplified by the amplifier 230, and be supplied to the signal processor 240.

At this time, the system control means 400 will supply a proper signal to the signal processor 240, so that the signals outputted from the signal processor 240 will be supplied to the other ones of the terminals of the switches 610, 620.

These signals supplied to the terminals of the switches 610, 620 are selected in accordance with the control signals C1, C2 outputted from the system control means 400.

Therefore, the signals inputted into the switch 610 will be line-outputted in the form of audio signals through the D/A converter 612 and the low pass filter 614, while the signals inputted into the switch 620 will be outputted in the form of digital signals through the digital output circuit 622 and the buffer 624.

When the only compact disc player is operated under a regeneration mode, the control signals C3, C4 outputted from the system control means 400 may well be in a "don't care" state.

Now the operation of the system according to the present invention will be described for the case where line-inputted analogue signals are to be recorded on a tape of the digital audio tape recorder.

If the relevant data is inputted into the data input means 300 in order to record the analogue signals inputted into the line input terminal on a tape of the digital audio tape recorder, then the system control means 400 will output signals for driving the signal processor 150, the drum 120, and the servo section 130 of the digital audio tape recorder 100 in accordance with the inputted data, and at the same time, will output a control signal C3 to the switch 630.

Upon supplying of the control signal C3 to the switch 630, the analogue signals inputted through the line input terminal will be filtered by the low pass filter 632, and then, will be inputted into the A/D converter 634.

The signals supplied to the A/D converter 634 will be converted to digital signals, and then, will be inputted into the signal processor 150.

Here, the sampling clock rate of the A/D converter 634 is equal to the sampling rate of the digital audio tape recorder 100.

The signals which are converted to digital signals and are inputted into the signal processor 150 of the digital audio tape recorder 100 will be amplified by the sound-recording amplifier 140, and will be recorded on the tape 110 by the drum 120.

In the process of reproducing the line-inputted analogue signals onto the tape 110, if the control signals C1, C2 outputted from the system control means 400 are controlled, then the line-inputted analogue signals, i.e., the signals inputted into the signal processor 150 will be outputted in the form of line outputs or digital signals, as described above, owing to the function of the switches 610, 620.

Meanwhile, the operation of the system of the present invention will be further described below for the case where the output signals of the compact disc player 200 are recorded onto the tape 110 of the digital audio tape recorder 100 under the condition that the sampling rate of the digital tape recorder 100 is different from the sampling rate of the compact disc player 200.

If the relevant data is inputted into the data input means 300 in order to record the output signals of the compact disc player 200 onto the tape 110 of the digital audio tape recorder 100, then the signal processor 240 and the servo section 210 of the compact disc player 200 will be activated by the system control means 400, and consequently, the pick-up section 220 will pick up the data recorded on the compact disc to supply it to the amplifier 230.

The signals supplied to the amplifier 230 will be amplified to a proper level, and then, will be supplied to the other ones of the terminals of the switches 610, 620 through the signal processor 240.

Under such a condition, the system control means 400 will supply the control signal C1 only to the switch 610, so that the signals picked up from the compact disc will be supplied to the D/A converter 612.

The digital signals supplied to the D/A converter 612 will be converted to analogue signals, will be filtered by the low pass filter 614, and thereafter, will be partly line-outputted, and partly supplied to the other one of the terminals of the switch 630.

The signals supplied to the terminal of the switch 630 will be selected by the control signal C3 outputted from the system control means 400, and will be supplied through the low pass filter 632 and the A/D converter 634 to the signal processor 150.

Here, the clock sampling rate of the A/D converter 634 will be same as the sampling rate of the digital audio tape recorder 100.

Upon supplying of the signals through the A/D converter 634 to the signal processor 150, the signals will be recorded onto the tape 110 through the drum 120 and the sound-recording amplifier 140 controlled by the system control means 400.

In this case, the control signal C2 outputted from the system control means 400 is supplied to the switch 620 so that the output signals of the signal processor 150 should be selected, while the control signal C4 supplied to the switch 650 is placed on a "don't it care" state.

Now the process of recording the output signals of the compact disc player 200 onto the tape 110 of the digital audio tape recorder 100 will be described under the condition that the sampling rate of the digital audio recorder 100 is the same as the sampling rate of the compact disc player 200.

Referring to FIG. 2, in order to record the output signals of the compact disc player 100 onto the tape 110 of the digital audio tape recorder 100, if the relevant data is inputted into the data input means 300, then the signal processor 240 and the servo section 210 of the compact disc player 200 will be activated by the system control means 400, so that the signals picked up from the compact disc will be supplied to the amplifier 230.

The signals after being amplified by the amplifier 230 will be supplied through the signal processor 240 to the other ones of the terminals of the switches 610, 620.

Under this condition, the control signals C1, C2 outputted from the system control means 400 will be supplied to the control terminals of the switches 610, 620, so that the signals should be selected from the above mentioned terminals.

Meanwhile, the control signal C4 outputted from the system control means 400 will be supplied to the control terminal of the switch 650, while the control signal C3 supplied to the control terminal of the switch 630 is put to a "don't it care" state.

Accordingly, the signals picked up from the compact disc and selected by the switch 620 will be supplied through the digital output circuit 622, the switch 650 and the digital input circuit 660 to the signal processor 150 of the digital audio tape recorder 100, and then, the signals will be ultimately recorded onto the tape 110.

Finally the operating process for recording external digital signals onto the tape 110 of the digital tape recorder 100 will be described.

If the relevant data is inputted into the data input means 300 in order to record external digital signals onto the digital audio tape 100, then the system control means 400 will output the control signal C4, so that the switch 650 should select the signals passed through the buffer 640.

The external signals selected by the switch 650 will be supplied through the digital input circuit 660 to the signal processor 150 of the digital audio tape recorder 100, and then, will be recorded on the tape 110 as described above.

The present invention was described in the above based on the embodiment of FIG. 2.

But it should be understood that the function of the digital input circuit 660 of FIG. 2 can be merged with the signal processor 150, and in the case of a stereo system each one of an A/D converter 634, a D/A converter 612, and low pass filters 614, 632 should be added.

Further, the levels of the plural control signals C1, C2 outputted from the system control means 400 are determined in order that only one group from among the signals supplied to both of the input terminals should be selected, while the switches 610, 620, 630, 650 are analogue switches for selecting the signals supplied to both of the input terminals in accordance with the levels of the control signals C1-C4.

As described above, the present invention combines a digital audio tape recorder and a compact disc player in such a manner that pick-signals of a compact disc or signals inputted from the external source can be conveniently reproduced onto a digital audio tape depending on the desire of the user.

What is claimed is:

1. A multiple audio signal processing system including a digital audio tape player for recording or reproducing audio signals and a compact disc player for reproducing audio signals comprising:

system control means for producing first to fourth switch control signals for controlling said processing system; and signal path control means having a digital input terminal, a digital output terminal, a line input terminal and a line output terminal for connecting said system to an external device;

wherein said signal path control means has a first signal path responsive to said first switch control signal for selectively supplying an output of said tape player or an output of said compact disc player to said line output terminal;

wherein said signal path control means has a second signal path having one input connected to said line output terminal and a second input connected to said line input terminal and is responsive to said second switch control signal for selectively supplying a signal from said first signal path or a signal at said line input from an external source to said tape player for recording;

wherein said signal path control means comprises a third signal path responsive to said third switch control signal for selectively supplying an output of said tape player or an output of said compact disc player to said digital output terminal; and wherein said signal path control means comprises a fourth signal path having an input connected to said third signal path and having another input connected to said digital input terminal and is responsive to said fourth switch control signal for selectively supplying a signal in said third signal path or a signal at said digital input terminal from another external source to said tape player.

2. A multiple audio signal processing system as set forth in claim 1 wherein said first signal path comprises:

a first switch, responsive to said first switch control signal, having inputs connected to said tape player output and said compact disc player output and having an output;

a digital-to-analog converter connected to the output of said first switch for converting a digital input signal from said tape player or said compact disc player to an analog signal; and a low pass filter for filtering said analog signal for output to said line output terminal.

3. A multiple audio signal processing system as set forth in claim 2, wherein said second signal path comprises:

a second switch, responsive to said second switch control signal, having inputs connected to said line input terminal and said line output terminal and having an output;

a low-pass filter connected to said output of said second switch; and an analog to digital convertor connected to an output of said low-pass filter for providing a digital signal to said tape player.

4. A multiple audio signal processing system as set forth in claim 3, wherein said low-pass filter has a clock frequency equal to a sampling frequency of said tape player.

5. A multiple audio signal processing system as set forth in claim 3, wherein said third signal path comprises:

a third switch, responsive to said third switch control signal, having input connected to said tape player output and said compact disc player output and having an output;

a digital output circuit connected to said output of said third switch for processing a signal output by said third switch; and a first buffer for buffering a signal output by said digital output signal for providing a buffered signal to said digital output terminal.

6. A multiple audio signal processing system as set forth in claim 5, wherein said fourth signal path comprises:

a fourth switch, responsive to said fourth switch control signal, having inputs connected to the output of said digital output circuit in said third signal path and to said digital input terminal via a second buffer and having an output; and a digital input circuit connected to said output of said fourth switch and having an output connected to said tape player.

7. A composite system for multiple audio signal processing, said composite system comprising:

a digital audio tape recorder and a compact disc player;

data input means for providing input data;

system control means for controlling operation of said composite system in response to said input data; and signal path control means for controlling a number of signal paths in response to a plurality of control signals output by said system control means;

wherein said signal path control means comprises a first switch in a first signal path including a digital-to-analog converter and a first low-pass filter for providing digital output signals from said compact disc player to said first path, in response to a first control signal, for recording on a tape in said digital audio tape recorder, and comprises a second switch in a second path including a second low-pass filter and an analog-to-digital converter for enabling said second path to receive said digital signals from said first path, in response to a second control signal, for input to said digital audio tape recorder.

8. The composite system as claimed in claim 7, wherein said second switch has a first input connected to an output of said first low-pass filter and a second input connected to an input terminal capable of being connected to an external audio source; and wherein said second control signal selectively controls said second switch to select said first input or said second input.

9. The composite system as claimed in claim 7, wherein said analog-to-digital converter and said digital audio tape recorder operate at a predetermined sampling rate.

10. The composite system as claimed in claim 7, wherein said signal path control means further comprises a third switch in a third signal path including a digital output circuit, a first buffer means and a digital output terminal capable of being connected to an external device, said third switch being responsive to a third control signal; and wherein said first switch and said third switch each include a first input connected to an output of said digital audio tape recorder and a second input connected to an output of said compact disc recorder.

11. The composite system as claimed in claim 10, wherein said signal path control means further comprises a fourth switch in a fourth signal path including a digital input circuit, a second buffer means and a digital input terminal capable of being connected to said external device;

wherein said fourth switch includes a first input and a second input, said first input being connected to an output of said second buffer, said second buffer having an input connected to said digital input terminal, and said second input being connected to an output of said digital output circuit in said third path, said output of said digital output circuit being further connected to an input of said first buffer means;

said fourth switch being responsive to a fourth control signal for selectively providing a digital signal from said second buffer or said digital output circuit to said digital input circuit, said digital input circuit being connected to provide a digital signal to said digital audio tape recorder.

* * * * *

UNITED STATES PATENT AND TRADEMARK OFFICE
CERTIFICATE OF CORRECTION

PATENT NO. : 5,105,314
DATED : Apr. 14, 1992
INVENTOR(S) : Il-young Ro

It is certified that error appears in the above-indentified patent and that said Letters Patent is hereby corrected as shown below:

Column 2, line 38, preceding "300", insert --means--;

Signed and Sealed this

Nineteenth Day of September, 1995

Attest:

BRUCE LEHMAN

Attesting Officer

Commissioner of Patents and Trademarks